United States Patent
Heie

(10) Patent No.: US 6,473,621 B1
(45) Date of Patent: Oct. 29, 2002

(54) METHOD AND APPARATUS FOR ENTERING SHORTCUT MESSAGES

(75) Inventor: Anders Fahnøe Heie, San Diego, CA (US)

(73) Assignee: Nokia Inc., Irving, TX (US)

(*) Notice: Subject to any disclaimer, the term of this patent is extended or adjusted under 35 U.S.C. 154(b) by 0 days.

(21) Appl. No.: 09/322,340

(22) Filed: May 28, 1999

(51) Int. Cl.[7] .................................................. H04Q 7/20
(52) U.S. Cl. ...................... 455/466; 455/566; 455/414; 455/550; 340/7.31; 704/2
(58) Field of Search ................... 455/466, 566, 455/414, 418, 550, 556, 412; 340/7.21, 7.22, 7.23, 7.53, 7.51, 7.52, 7.31; 341/20–28; 345/352; 707/535, 534, 533, 540; 704/10, 2, 3

(56) References Cited

U.S. PATENT DOCUMENTS

| | | | | |
|---|---|---|---|---|
| 4,796,185 A | * | 1/1989 | Yoshimura et al. ........... 704/10 |
| 4,959,785 A | * | 9/1990 | Yamamoto et al. ......... 707/533 |
| 5,303,151 A | * | 4/1994 | Neumann ....................... 704/2 |
| 5,797,098 A | * | 8/1998 | Schroeder et al. ........... 455/464 |
| 5,818,437 A | | 10/1998 | Grover et al. ............... 345/326 |
| 6,032,053 A | * | 2/2000 | Schroeder et al. ....... 455/566 X |
| 6,049,697 A | * | 4/2000 | Scozzarella et al. ........ 340/7.31 |
| 6,259,405 B1 | * | 7/2001 | Stewart et al. .............. 342/457 |

OTHER PUBLICATIONS

Camarda, Bill; Using Microsoft Word 97; 1997; Que Corporation; pp 196–203.*

* cited by examiner

Primary Examiner—Tracy Legree
(74) Attorney, Agent, or Firm—Robert C. Rolnik

(57) ABSTRACT

A translator for wirelessly provided messages. A user interface is provided that permits a replacement of text to be made if a defined term is detected, followed by further replacements of text if any defined terms are found within the first replacement text. Replacement of text may also be staged, such that a first part of a replacement may be made, suspending the replacement until a condition is met. A user may fulfill the condition by entering in a string including a delimiter, whereupon a second part of the replacement is completed.

16 Claims, 4 Drawing Sheets

| DEFINED TERM | SUBSTITUTE DATA |
|---|---|
| #name# | Jane Smith |
| #55# | +++ |
| #fax# | 972-555-1212 |
| #44# | Sincerely, #name##55##fax# |
| #leav# | I am leaving ~#~ now |
| #lat# | I am running ~#~ minutes late |
| #tr# | the train station |
| | |
| | |

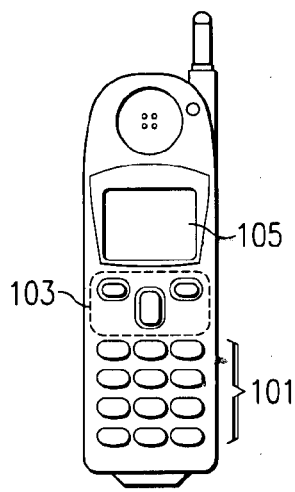
FIG. 1a
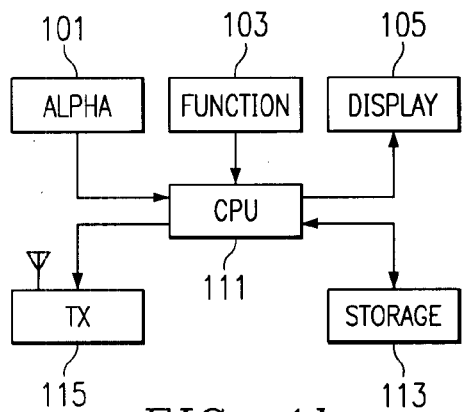
FIG. 1b
| DEFINED TERM | SUBSTITUTE DATA |
|---|---|
| #name# | Jane Smith |
| #55# | +++ |
| #fax# | 972-555-1212 |
| #44# | Sincerely, #name##55##fax# |
| #leav# | I am leaving ~#~ now |
| #lat# | I am running ~#~ minutes late |
| #tr# | the train station |
|  |  |
|  |  |
FIG. 2a
| DEFINED TERM | SUBSTITUTE DATA |
|---|---|
| #fanfare# | Ta-da.wav |
FIG. 2b

METHOD AND APPARATUS FOR ENTERING SHORTCUT MESSAGES

FIELD OF THE INVENTION

The invention relates to methods using devices having keyboards, more particularly, the invention relates to methods of entering and transmitting messages containing shorthand text strings or defined terms from a network device to another network device.

DESCRIPTION OF THE RELATED ART

As wireless devices become more and more common, there is an increasing need to make such devices operate efficiently in text messaging mode. Currently most Personal Communication Services (PCS) phones offer a text message receive capability. Some phones provide text editing and transmitting functions, wherein a short message is sent from the phone. In addition, a number of mobile stations are pure text devices, equivalent to a sophisticated pager, except now able to originate text messages.

Because the use of a mobile station having a phone or pager form factor requires either a keyboard with fewer than a complete QWERTY arrangement, or a shrunken computer keyboard, the act of keying in meaningful phrases is vastly more difficult than with a standard computer keyboard. In addition, most phone users are accustomed to keying in numbers using a single hand.

A complicating factor is that a mobile station is often purchased so a user can make use of down-time, such as waiting in a line. Since the mobile phone stations are seen as time-savers, users frequently will have little patience to enter messages that include greetings and closings and other strings of text that require tedious keyboard input. For example, for a phrase like "I'm on my way" or "I'm at the store" would be helpful to enter in 5 or fewer keystrokes.

In addition, a subscriber to wireless services may wish, from time to time to reveal certain personal information, as commonly occurs using conventional emails and web browsing sessions. Quick access to information previously stored on a mobile such as a phone number, fax number, company name, address, etc. could be extremely helpful, and perhaps even quicker than presenting a business card.

In addition, some operating characteristics of a mobile station may be helpful to refer to in a shorthand notation. Unfortunately, no devices or software are available to do this at the behest of a mobile user.

Keyboard disambiguating computers have been proposed in the past. U.S. Pat. No. 5,818,437 which issued Oct. 6, 1998 discloses a method to enter a first word in a list of words having characters that match a 3 to 4 alpha character marking in an entered key sequence. The patent discloses ways of providing a default word when part, or ambiguous key sequences are entered. The word is selected following a select, or space-key entry. This patent handles single words well, but is unable to handle replacement using phrases.

SUMMARY OF THE INVENTION

An embodiment of the present invention provides a method and apparatus to detect matches to strings marked for substitution and subsequently to replace those strings with a corresponding expansion strings of text or other audio-visual data, even while a user edits a message. The method operates even on expansion strings, locating substrings marked for substitution and making corresponding replacements, if replacement text is available. The method has the advantage that lengthy strings need not be keyed in, saving considerable time, when a shorthand string is available. There is an additional advantage in that storage is more efficiently used by permitting redundant text to be referred to even in expansion or substitute data by way of the shorthand strings.

Typically, this embodiment is used to save keystrokes for certain types of text messages that are commonly used. For example when this embodiment is implemented on mobile phone, the user is able send text messages by selecting and combining certain known messages that are previously stored in memory. This embodiment allows the user to enter shortcut code instead of entering the entire message. For example, when a user wants to send a text message using a mobile phone, the user enters a starting delimiter, the location of stored message and the end delimiter. As the user completes entering the location, the message stored at the location will be displayed on a display. The user then completes the message or make specific modifications before transmitting the message.

Another advantage of this embodiment is that several stored messages may be nested together to form several unique messages. For example, if the user wanted to create "Honey, I will be home at 6pm" text message, the first string "Honey, I will be home at" stored at first location and would access "6pm" string which is stored at second location.

In another embodiment of the invention, the display could be in a form of an audio feedback, such that when the user completed the message, the mobile phone would play an audio or audio version of the stored message.

BRIEF DESCRIPTION OF THE DRAWINGS

FIG. 1a is a mobile station user interface according to an embodiment of the invention.

FIG. 1b is a block diagram of a mobile station according to an embodiment of the invention.

FIG. 2a is a text to text storage table.

FIG. 2b is a text to audio-visual data storage table.

DETAILED DESCRIPTION OF THE INVENTION

Figures 3A, 3B, 3C, 3D:
FIG. 3a is an example of a message buffer that an embodiment of the present invention operates upon.
FIG. 3b is an example of a message buffer following a single iteration of a loop of a text-to-text replacement algorithm.
FIG. 3c is an example of a message buffer following a second iteration of a loop of a text-to-text replacement algorithm.
FIG. 3d is an example of a message buffer following a third iteration of a loop of a text-to-text replacement algorithm.

FIG. 1A shows a mobile station 100 according to an embodiment of the invention. Mobile station has alphanumeric keys 101 for use in editing and addressing messages, among other mobile station functions. In addition mobile station provides function keys 103 which may be used to make menu selections from a display 105, as well as respond in an interactive manner to prompts from the display 105.

FIG. 1B shows a CPU 111 which controls input-output of the mobile station user interface, as well as other functions via the alphanumeric keys 101, the function keys 103, and the display 105. CPU also accesses storage 113 which may be a register, RAM, or other non-volatile storage. In addition, mobile station has a transmitter 115 which may be used to transmit data, for example messages composed using the alphanumeric keys 101 and the function keys 103.

FIG. 2a shows a text to text table 200 having storage according to an embodiment of the invention. The table is comprised of two columns, the defined term column 201 and the substitute data column 203. The defined terms represent strings, that if found in a message buffer, should be replaced. The substitute data correspond one for one with each of the defined terms 201 such that every defined term has a substitute data which is intended to operate as a replacement for occurrences of defined terms found. The defined terms may be stored with or without delimiter characters 205, and, moreover, the defined terms may be stored with zero or more delimiter characters. In the embodiment, the defined terms are stored with delimiter characters. Delimiter characters, if used, may be ASCII or other standard character set characters that are infrequently used in text messages, for example the '#' character or the '~' character. The table may be arranged as pointers to storage in RAM memory, or as references to text information on non-volatile storage such as a disk drive.

FIG. 2b shows a text to audio-visual table 220 which may be used to identify text which should be replaced with non-text data, e.g. audio or graphical. Such a table could include a regular expression, as is known in the UNIX 'grep' command to identify instances where audio-visual data should be incorporated in to the message. By convention, such non-text insertions may be made at the beginning of the message, end of the message, or between the beginning and end, but with header and trailer data to signify a change in the message format. Alternatively, each message could be sent with a table in the head of the message which identifies 1) the offset into the file to the beginning of a certain data type; 2) the number of bytes until the end of the data type; and 3) the type of the data. Table 220 has a defined term column 221 and a substitute data column 223 which may be a pointer to memory, a path to a file, or any other reference to data.

FIG. 3a shows a string prior to operation of an embodiment of the invention. A single iteration of a replacement algorithm will detect a single string 301 that matches a defined term. The replacement according to the algorithm and dictionary storage produces the string shown in FIG. 3b. FIG. 3b contains three strings for replacement: #name# 313, #55# 315, and #fax# 317. If the defined terms of the table are checked from top to bottom, a second review from top to bottom is required, since the previous iteration of the steps of checking the defined terms created new, unexamined text for the message buffer. The second loop by the algorithm produces the string in buffer shown in FIG. 3c. FIG. 3c has no replacement strings, which is determined on a third iteration of looking through the defined terms of the table. FIG. 3d represents the completed result of the text to text replacement algorithm which has expanded all defined terms in the original buffer of FIG. 3a, and expanded strings that were nested inside of the substitute data of single string 301.

Figure 4:
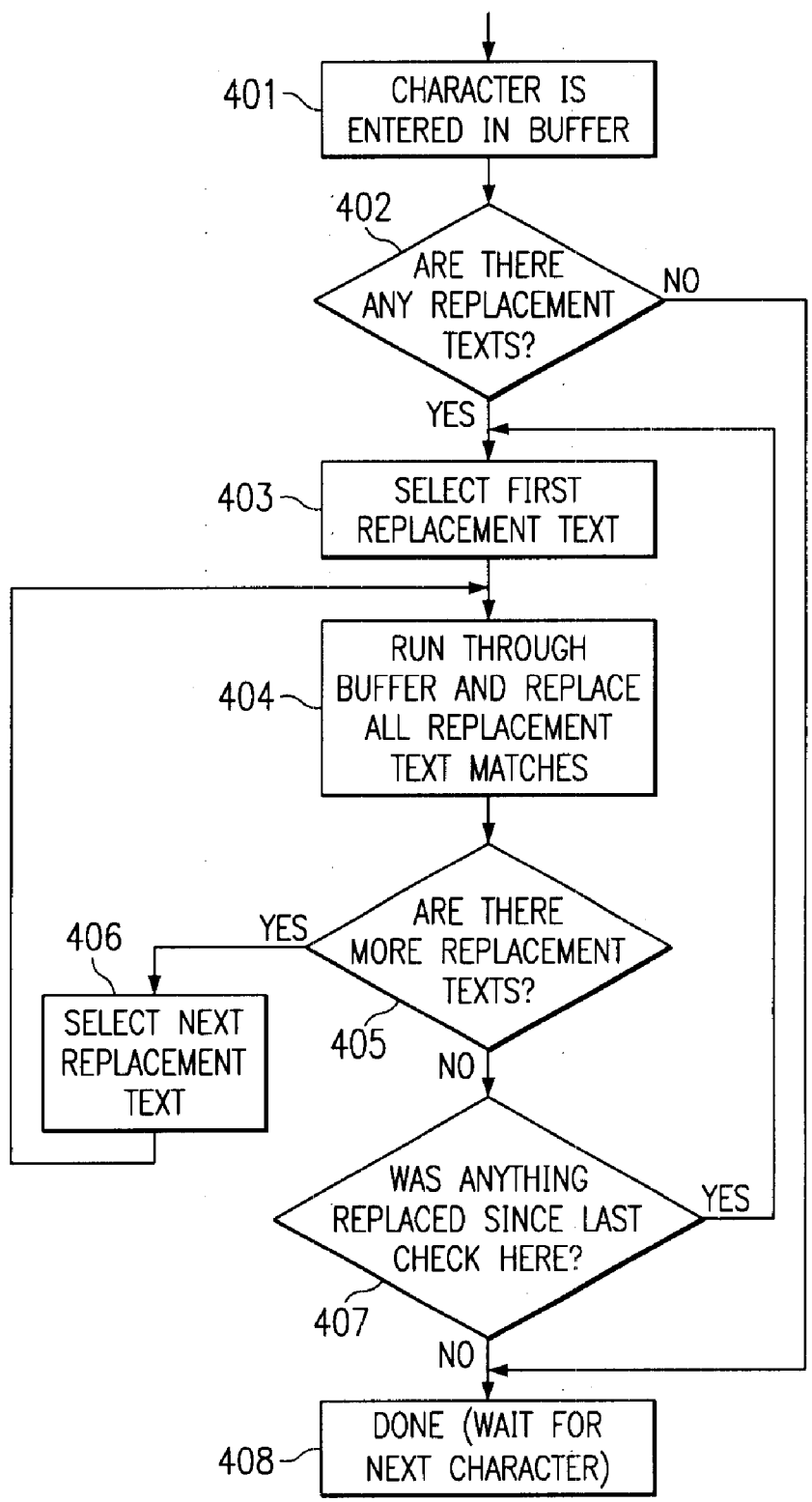
FIG. 4 is a flow chart a text-text expansion algorithm of an embodiment of the invention.

FIG. 4 shows a flowchart of the text to text expansion algorithm that operates on a CPU of communication device and operates on the message stored in a buffer. The communication device may be a mobile station. Starting event 401 may be triggered by using the function keys to command the start of the algorithm on a message or buffer, which may be visible, in part, on a display of the mobile station. The simplest example of this would be the entry by a user of a contiguous set of nonwhitespace characters terminated with a delimiter, wherein the delimiter operates as a function key that triggers the processing of all characters to the left (enter prior to delimiter) up to the first nonwhitespace character. A test 402 is performed to determine if the text to text table has any defined terms, or replacement texts. Providing a defined term exists, a first defined term is selected at step 403. In the following step 404, the defined term is compared to each same length string found within the buffer, by moving, for example, from one end of the buffer to the next. Included in this step is the operation of making a replacement on the occurrence of a match by using the corresponding substitute data.

In replacement step 404 replacement may occur, for example, by handling three strings:

the buffer from beginning to the match, or string 1;

a copy of substitute data string, or string 2; and the buffer that follows the match, extending to the end of the buffer, or string 3.

The replacement, for example, occurs by creating a new buffer comprised of appending string 3 to string 2 to string 1.

A test is made to see if there are remaining defined terms in the (text to text table) dictionary to be checked—step 405. The next defined term of the dictionary is selected in the next step 406. Repeated execution of steps 404 and 405 occur until the defined terms of the dictionary are exhausted as determined in step 405. At that point, the occurrence of a replacement during the last iteration of steps 403, 404, 405 and 406 is detected in step 407. Step 407 permits an additional iteration of steps 403, 404, 405 and 406, wherein for this additional iteration, each of the defined terms is treated as not having been previously selected. This step enables the expansion or replacement of nested strings found inside substitute data and provides a key benefit of the invention—more efficient storage of substitute data. In its totality, the operation of converting defined terms to substitute data, and then further converting defined terms appearing in substitute data to yet more substitute data is called nested substitution, or nested substituting. A nested string is a defined term that appears in the substitute data of another defined term.

Note that if it is elected to store the defined terms in a table without delimiters, a step of discarding the '#' (delimiter) from the user input string is required if it is desired to prevent the '#' from persisting in the message following the operation of the algorithm.

The following is an example of a 'C' language instance of source code that can execute the algorithm mentioned. The algorithm could be implemented in other languages including, but not limited to object oriented languages. A prerequisite to the operation of the following source code is that a table 'ReplacementTexts [NumberOfReplacementTexts]' exists for all functions and operates as an array of defined terms. A further prerequisite is that and that the 'buffer' exists and contains text. The function call 'replace_text' operates as shown in replacement step 404.

```
/* Normal Editing */
/* 'replace all' detected */
do
{
  recurse = FALSE;
  for(i=0; i < NumberOfReplacementTexts; i++)
  {
    tlength = strlen(ReplacementTexts[i])
    for(ccount = 0; ccount < (strlen(buffer) - tlength ) ; ccount++)
    {
      if(strncmp(ReplacementTexts[i], buffer + ccount, tlength) == 0)
      {
        /* Replace text */
        buffer = replace_text( ccount, i);
        recurse = TRUE;
      } /* end replace */
    } /* end running through buffer */
  } /* end running through replacement texts */
} while(recurse);
```

Another embodiment of the invention could include a preliminary step before executing a comparison of strings that makes it a prerequisite that a comparison be made only on strings that are bounded on both ends by a unmodified delimiter character. A delimiter could be modified to indicate that the character should not be treated as a delimiter, and should be handled as an ordinary alphanumeric character. For example the combination of the single quote before the delimiter would act to modify the character. This would occur when the subject and text of the message should literally include the delimiter at the location where the message is intended to go.

Another embodiment of the invention could include a second scan through the resultant text containing substituted data. The second scan would identify strings found in the text to audio-visual substitution defined terms table.

Another embodiment of the invention could include providing a specialized string that operates as a placeholder for a fill-in the blank field. Such a field would be stored with a special symbol or character string at the location where user input is required. One possible character string to use as the placeholder is the three character '~#~' string. A substitute data would include the placeholder string. Upon the user entering the defined term that references the substitute data having the placeholder string, the mobile station would display the substitute data, up to the blank, leaving room for the user to enter information, i.e. a substitute data first part would be displayed. Under no condition would the placeholder be displayed, except that a symbol representing the blank, or a prompt could appear alerting the user to an expected input. The user would have two choices 1) enter a literal string terminated with a delimiter;

2) enter a defined term, followed by a delimiter

Option 1 results in the mobile station showing the literal string character for character as the user enters it. Upon entering the delimiter, the mobile station displays whatever remaining characters exist in the substitute text, i.e. a substitute data second part would be displayed. Additional entries may be made at the right end of the substitute text.

Option 2 results first in the mobile station showing the defined string character for character as the user enters it. When the user enters the delimiter, the substitution algorithm looks up the substitute text that corresponds to the defined text and replaces all characters with the substitute text, i.e. a substitute data first part would be displayed. Next, providing the user enters another delimiter, the mobile station displays whatever remaining characters exist in the substitute text that had the placeholder, i.e. a substitute data second part would be displayed. Additional entries may be made at the right end of the substitute text. Table 1 illustrates an example of the text entered by a user using the defined term and substitute text combinations #leav# 252, and #tr# 254 follows:

TABLE 1

| Input | Displayed result |
| --- | --- |
| #leav | #leav |
| #leav# | I am leaving |
| #leav#tr | I am leaving tr |
| #leav#tr# | I am leaving the train station |
| #leav#tr## | I am leaving the train station now |

Figure 5:
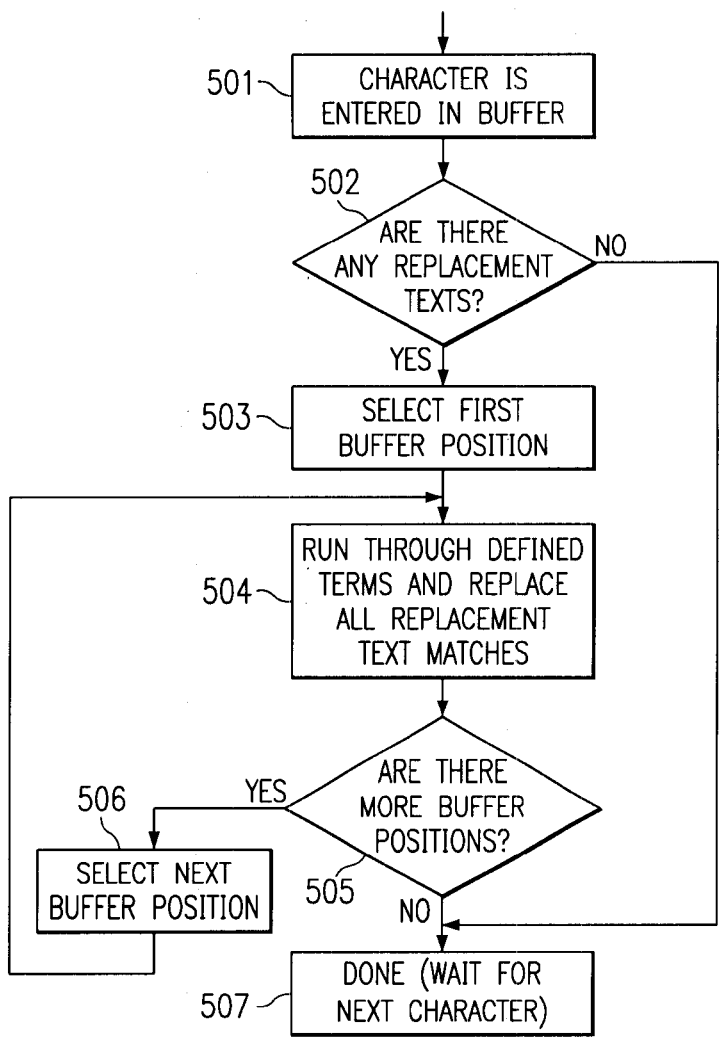
FIG. 5 is a flow chart of a text to audio-visual data conversion of an embodiment of the invention.

FIG. 5 shows an flowchart of the algorithm that operates on a CPU of a communication device and operates on the message following expansion of all defined terms of the text to text storage table. The communication device could be a mobile station. Starting event 501 may be triggered by the end 408 of the text-text expansion algorithm of FIG. 4 on a message or buffer. A test 502 is performed to determine if the text to audio-visual table has any defined terms, or replacement texts. Providing a defined term exists, a first buffer position is selected 503. In the following step 504, each defined term is compared to the string of chars from the buffer position to the length of the defined term by selecting, for example, each defined term, from first to last. Included in this step is the operation of making a replacement on the occurrence of a match by using the corresponding substitute data.

A test is made to see if there are remaining positions in the buffer to be checked—step 505. The next buffer position is selected in the next step 506. Repeated execution of steps 504, 505 and 506 occur until the buffer is exhausted as determined in step 505.

Figure 6:
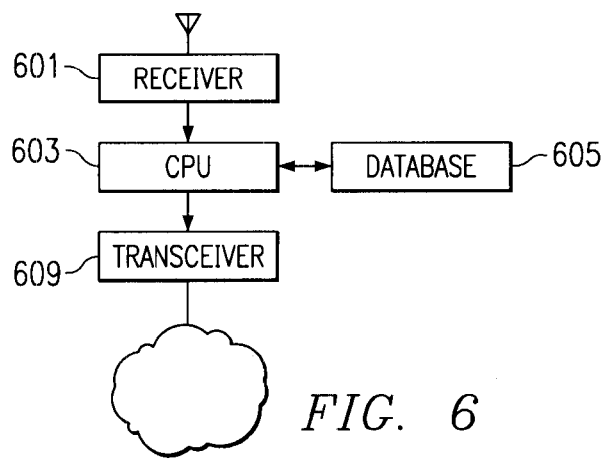
FIG. 6 is a block diagram of a network element according to an embodiment of the invention.

FIG. 6 shows another embodiment of the invention which includes a CPU located at a fixed network side of a wireless connection. The network includes a digital wireless receiver 601 which can be any one of the various cellular standard receivers, or two-way pager receivers as is known in the art, and may include antennas, duplexers, filters, amplifiers and power supplies to accomplish the purpose of receiving RF modulated signals and convert such signals to text having addressing information. In the event an analog cellular receiver is used, the signal may be further processed with a modem for transporting the text message to other network elements. A CPU 603 may be collocated with cellular transceiver, but if the CPU is not, CPU uses a network transceiver to receive the text message on a LAN, WAN, or cellular fixed network transport (e.g. microwave or T1 or E1 carrying media). CPU accesses a database 605 of defined terms and substitute data that correspond to the originating address of the message. The originating address may be any one of mobile identification number (MIN) or electronic serial number (ESN), personal identifier (PIN) or caller ID number, or any other unique identifier of the originator of the message. CPU performs a global search and replace in the message body for each occurrence of a defined term of the database 605, thereby replacing the defined term with substitute text of the database 605. Such a global search and replace is repeated so that replacements are made to defined text that is nested within a substitute data. CPU then transports the resultant augmented text or augmented stream by transmitting the augmented text through a network transceiver 609, which may be a T1, E1, ethernet, twisted pair, optical or other transceiver as is known in the art to transport packets and serial data to an addressed recipient, which may be on a wired or wire-wireless hybrid network 611, such as, for example a LAN, WAN, cellular infrastructure, paging infrastructure, internet or intranet.

Since CPU is located on the network side, it is likely that the CPU will translate, forward and otherwise serve several mobile stations each having its own unique mobile subscriber identifier. Database 605 could be one of several, each one earmarked for use with messages arriving from a particular mobile station, such that each database is individualized to the mobile station that it corresponds. This is not to say that each database is completely distinct, as it is possible that common data, files or resources, e.g. sound files, might be referred to in multiple databases, each database corresponding to a different mobile station.

Although the invention has been described in the context of particular embodiments, it will be realized that a number of modifications to these teachings may occur to one skilled in the art. Also in the scope of the invention, is methods that operate on defined term that are regular expressions having wildcards and other rules for specifying matches. In addition, although steps of user entry and substitutions may be displayed to a display, the entries and replacements may be transmitted by sounds representing the text. Thus, while the invention has been particularly shown and described with respect to specific embodiments thereof, it will be understood by those skilled in the art that changes in form and configuration may be made therein without departing from the scope and spirit of the invention.

What is claimed is:

1. A method for entering a message comprising the steps of:
    a) obtaining an input string from a user;
    b) replacing the input string to produce a first substitute data that corresponds to at least a portion of the input string; and
    c) replacing a nested string in the first substitute data with a second substitute data corresponding to said nested string.

2. The method for entering a message of claim 1 further comprising the step of displaying the first and second substitute data.

3. The method for entering a message of claim 1 further comprising the step of transmitting the first and second substitute data over a wireless link.

4. The method of entering a message of claim 1 further comprising the step of converting the first or second substitute data to sound after step c.

5. The method of entering a message of claim 1 wherein the step b further comprises the steps of:
    a) setting a search point to a first end of the input string;
    b) locating from the search point to a second end of the input string at least one defined term;
    c) locating in storage any match of said at least one defined term to a first substitute data;
    d) replacing the at least one defined term to a first substitute data with the first substitute data; and
    e) setting the search point at the end of the first substitute data in the input string.

6. The method of replacing and transmitting text of claim 1 wherein the step c further comprises the steps of:
    a) setting a search point to a first end of the first substitute data;
    b) locating from the search point to a second end of the string at least one defined term;
    c) locating in storage any match of said at least one defined term to a second substitute data;
    d) replacing the at least one defined term to a second substitute data with a copy of the second substitute data having an end; and
    e) setting the search point at the end of the second substitute data in the first substitute data.

7. A method for entering and transmitting a data string comprising the steps of:
    a) Obtaining a data string from a user;
    b) Obtaining a first substitute data that corresponds to the data string
    c) Replacing any nested data string in the first substitute data to produce an expanded substitute data; and
    d) Replacing the data string with expanded substitute data.

8. The method for replacing and transmitting a string of claim 7 further comprising the step of displaying the data string.

9. The method for entering and transmitting a string of claim 7 further comprising the step of transmitting the data string over a wireless link.

10. A method for entering and transmitting a data string comprising the steps of:
    a) obtaining a first data string from a user;
    b) replacing the first data string with a substitute data first part that corresponds to the first data string to produce a first replacement data string;
    c) obtaining a second data string from a user; and
    d) appending the second data string to the first replacement data string to produce a second replacement data string
    e) appending to the second replacement string a substitute data second part that corresponds to the first string.

11. A mobile station for entering and transmitting a string comprising:
    a means for obtaining a data string from a user
    a means for replacing the data string to produce a first substitute data that corresponds to the data string; and
    a means for replacing a nested string in the first substitute data with a second substitute data corresponding to said nested string.

12. A mobile station for entering and transmitting a string comprising:
    a means for obtaining a data string from a user;
    a means for obtaining a first substitute data that corresponds to the data string;
    a means for replacing a nested string in the first substitute data to produce an expanded substitute data; and
    a means for replacing the data string with said expanded substitute data.

13. A method for replacing and transmitting text in a message stored in a buffer wherein the message includes defined terms comprising the steps of:
    a) selecting a defined term from a set of defined terms stored in the buffer;
    b) substituting all occurrences of the selected defined term of step a in the buffer with selected substitute data corresponding to the selected defined term;

c) repeating steps a and b until all the defined terms of the set of defined terms have been selected; and d) repeating steps a, b and c if at least one of said selected substitution data substituted in step b includes a new defined term.

14. A device for translating text strings comprising:

a memory for storing a plurality of defined terms and substitute data, wherein the memory stores a plurality of defined terms collectively assigned to a mobile subscriber identifier;

a means for substituting at least a portion of said substitute data in said memory for each match of a defined term in a text string and providing a augmented stream; and a network transceiver operatively coupled to the means for substituting the network transceiver transmitting the augmented stream.

15. The device for translating text strings of claim 14, wherein a substitute data corresponds to multiple defined terms.

16. The device for translating text strings of claim 15, wherein a substitute data corresponds to multiple defined terms in storage corresponding to multiple mobile subscriber identifiers.

* * * * *